United States Patent
Mannebach et al.

(10) Patent No.: US 9,879,099 B2
(45) Date of Patent: Jan. 30, 2018

(54) POLYETHYLENE COMPOSITION HAVING HIGH STRESS CRACKING RESISTANCE

(71) Applicant: BASELL POLYOLEFINE GMBH, Wesseling (DE)

(72) Inventors: Gerd Mannebach, Munstermaifeld (DE); Bernd Lothar Marczinke, Frankfurt (DE); Gerhardus Meier, Frankfurt (DE); Ulf Schuller, Frankfurt (DE); Iakovos Vittorias, Mainz (DE); Harilaos Mavridis, Lebanon, OH (US)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 15/527,158

(22) PCT Filed: Oct. 27, 2015

(86) PCT No.: PCT/EP2015/074863
§ 371 (c)(1),
(2) Date: May 16, 2017

(87) PCT Pub. No.: WO2016/078880
PCT Pub. Date: May 26, 2016

(65) Prior Publication Data
US 2017/0355788 A1    Dec. 14, 2017

Related U.S. Application Data

(60) Provisional application No. 62/081,396, filed on Nov. 18, 2014.

(51) Int. Cl.
*C08F 10/02* (2006.01)
*B01D 71/26* (2006.01)

(52) U.S. Cl.
CPC .............. *C08F 10/02* (2013.01); *B01D 71/26* (2013.01)

(58) Field of Classification Search
None
See application file for complete search history.

(56) References Cited

FOREIGN PATENT DOCUMENTS

| EP | 2380919 A2 | 10/2011 |
|---|---|---|
| WO | WO-2007118866 A1 | 10/2007 |
| WO | WO-2012115951 A1 | 8/2012 |

OTHER PUBLICATIONS

International Search Report and Written Opinion dated Dec. 14, 2015 (14.12.20.15) for Corresponding PCT/EP2015/074863.

*Primary Examiner* — Catherine S Branch

(57) ABSTRACT

A polyethylene composition made from or containing a polyethylene, having the following features:
1) a density from about 0.930 to about 0.945 g/cm$^3$, determined according to ISO 1183 at 23° C.;
2) a ratio of MIF/MIP from about 30 to about 55;
3) a MIF from about 3 to about 25 g/10 min.;
4) a Mz equal to or greater than about 1,500,000 g/mol; and
5) a long-chain branching index, LCBI, equal to or lower than about 0.55, wherein the LCBI is the ratio of the measured mean-square radius of gyration $R_g$, measured by GPC-MALLS, to the mean-square radius of gyration for a linear PE having about the same molecular weight of 1,000,000 g/mol.

11 Claims, 1 Drawing Sheet

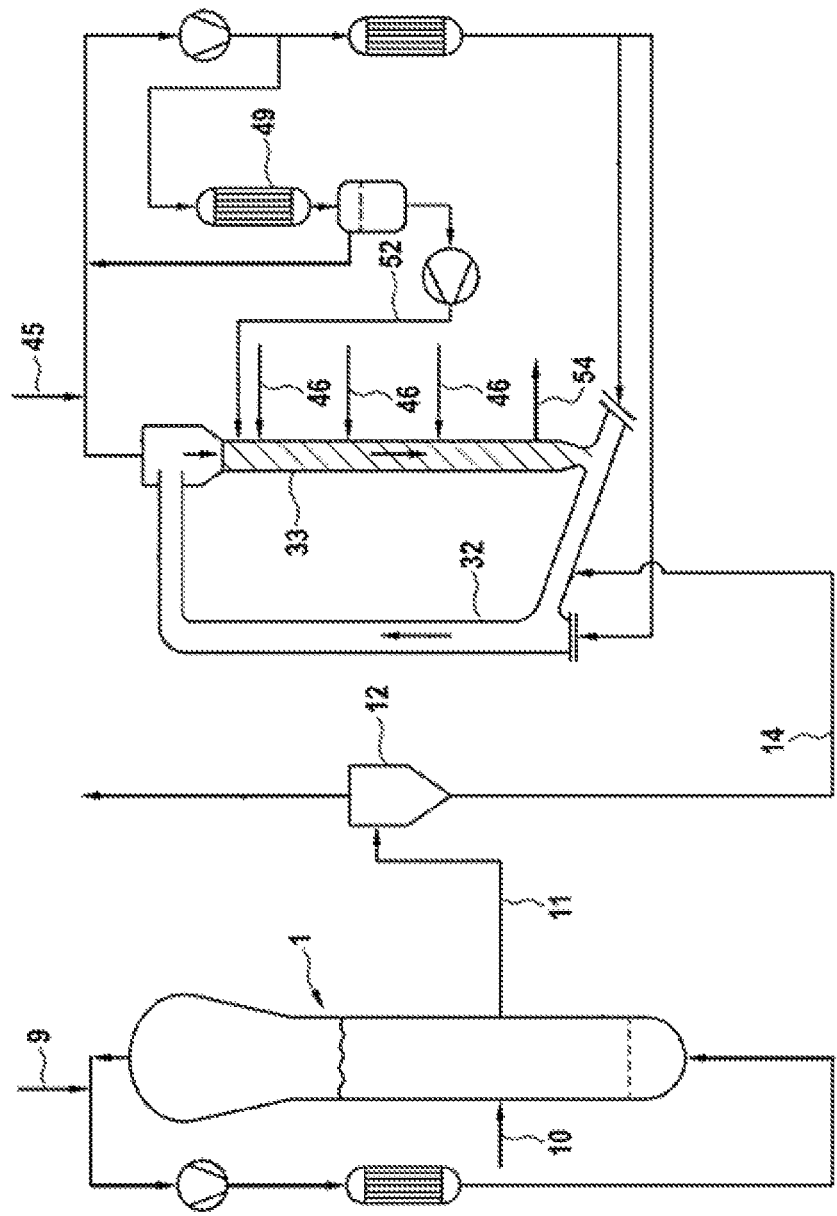

POLYETHYLENE COMPOSITION HAVING HIGH STRESS CRACKING RESISTANCE

This application is the U.S. National Phase of PCT International Application PCT/EP2015/074863, filed Oct. 27, 2015, claiming benefit of priority to U.S. patent application No. 62/081,396, filed Nov. 18, 2014, the contents of which are incorporated herein by reference in its entirety.

FIELD OF THE INVENTION

In general, the present disclosure relates to the field of chemistry. More specifically, the present disclosure relates to polymer chemistry. In particular, the present disclosure provides a polyethylene composition having density from about 0.930 to about 0.945 g/cm$^3$ and an Environmental Stress Cracking Resistance of at least 450 h, measured by FNCT 80° C./4 MPa. The polyethylene composition can be used for preparing membranes, including geomembranes.

Geomembranes can be employed for waste containment, mining applications or water containment and conveyance.

BACKGROUND OF THE INVENTION

Polyethylene materials with medium to high density are characterized by a balance of chemical inertia, flexibility and processability properties useful for producing geomembranes.

Another important requirement for use in geomembranes is the Environmental Stress Cracking Resistance (ESCR).

However, it is very difficult to achieve in the polyethylene materials a good balance between ESCR and processability.

SUMMARY OF THE INVENTION

In general embodiments, the present disclosure provides a polyethylene composition made from or containing a polyethylene having the following features:
1) a density from about 0.930 to about 0.945 g/cm$^3$, alternatively from about 0.935 to about 0.942 g/cm$^3$, determined according to ISO 1183 at 23° C.;
2) a ratio of MIF/MIP from about 30 to about 55, alternatively from about 35 to about 50, where MIF is the melt flow index at 190° C. with a load of 21.60 kg, and MIP is the melt flow index at 190° C. with a load of 5 kg, both MIF and MIP determined according to ISO 1133;
3) a MIF from about 3 to about 25 g/10 min., alternatively from about 5 to about 20 g/10 min., alternatively from about 5 to about 18 g/10 min.;
4) a Mz equal to or greater than about 1,500,000 g/mol, alternatively equal to or greater than about 2,000,000 g/mol, measured by GPC-MALLS (Gel Permeation Chromatography coupled with Multi-angle laser-light scattering); and
5) a long-chain branching index, LCBI, equal to or lower than about 0.55, alternatively equal to or lower than about 0.50, wherein LCBI is the ratio of the measured mean-square radius of gyration R$_g$, measured by GPC-MALLS, to the mean-square radius of gyration for a linear PE having about the same molecular weight at a mol. weight of 1,000,000 g/mol.

BRIEF DESCRIPTION OF THE DRAWINGS

These and other features, aspects, and advantages of the present disclosure will become better understood with reference to the following description and appended claims, and accompanying drawing figure where:

FIG. 1 is a simplified process-flow diagram of two serially connected gas-phase reactors for use in accordance with various embodiments of ethylene polymerization processes disclosed herein to produce various embodiments of the polyethylene compositions disclosed herein.

It should be understood that the various embodiments are not limited to the arrangements and instrumentality shown in the drawing figure.

DETAILED DESCRIPTION OF THE INVENTION

In the present description, the expression "polyethylene composition" is intended to embrace a polyethylene, as alternatives, both a single ethylene polymer and an ethylene polymer composition, including a composition of two or more ethylene polymer components. In some embodiments, the polymer components can have different molecular weights, such composition being also called "bimodal" or "multimodal" polymer in the relevant art.

In some embodiments, the polyethylene composition is made from or contains a polyethylene made from or containing one or more ethylene copolymers.

All the features herein defined, including the features 1) to 5) described in the Summary of the Invention section, are referred to as features of a single ethylene polymer or an ethylene polymer composition. The addition of other components, like the additives, can modify one or more of said features.

A measure of the molecular weight distribution is provided by the ratio $M_{w\_MALLS}/M_{n\_GPC}$, where $M_{w\_MALLS}$ is the weight average molar mass measured with MALLS coupled to GPC and $M_{n\_GPC}$ is the number average molar mass, measured by GPC (Gel Permeation Chromatography).

In some embodiments, $M_{w\_MALLS}/M_{n\_GPC}$ values for the polyethylene composition range from about 36 to about 48.

In some embodiments, the $M_{w\_MALLS}$ values are equal to or higher than about 300,000 g/mol, alternatively equal to or higher than about 350,000, alternatively from about 300,000 to about 600,000 g/mol, or from about 350,000 to about 600,000 g/mol.

In some embodiments, Mz for the polyethylene composition is from about 1,500,000 to about 3,500,000 g/mol, alternatively from about 2,000,000 to about 3,500,000 g/mol.

In some embodiments, the polyethylene composition can have at least one of the following additional features.

a MIP: about 0.05-about 1.5 g/10 min.;
  an elongational hardening at 0.5 s$^{-1}$, T=150° C. of about 0.9 or higher, alternatively from about 0.9 to about 2;
  an elongational hardening at 0.1 s$^{-1}$, T=150° C. of about 0.9 or higher, alternatively from about 0.9 to about 2;
  a comonomer content equal to or less than about 8% by weight, alternatively from about 3 to about 8% by weight, with respect to the total weight of the polyethylene.

In some embodiments, the comonomer or comonomers present in the ethylene copolymers are selected from olefins having formula $CH_2=CHR$ wherein R is an alkyl radical, linear or branched, having from 1 to 10 carbon atoms. Examples include propylene, butene-1, pentene-1, 4-methylpentene-1, hexene-1, octene-1 and decene-1. In some embodiments, the comonomer is hexene-1.

In some embodiments, the LCBI for the polyethylene composition is from about 0.55 to about 0.3, alternatively from about 0.50 to about 0.30.

In some embodiments, the polyethylene composition, wherein the polyethylene is made from or contains:
A) about 40-about 60% by weight of an ethylene homopolymer or copolymer, based upon the total weight of the polyethylene, with a density equal to or greater than about 0.945 g/cm$^3$ and a melt flow index MIE at 190° C. with a load of 2.16 kg, according to ISO 1133, of about 1-about 25 g/10 min.; and
B) about 40-about 60% by weight of an ethylene copolymer, based upon the total weight of the polyethylene, having a MIE value lower than the MIE value of component A). In some embodiments, the MIE value of component B) is lower than about 0.5 g/10 min.

The above percent amounts are given with respect to the total weight of A)+B)=100%.

In general embodiments, the present polyethylene composition can be used to make an article of manufacture, including a membrane. In some embodiments, the membrane is a geomembrane.

In some embodiments, the ESCR values, measured by FNCT 80° C./4 MPa, are about 450 h or higher, alternatively about 500 h or higher, alternatively from about 450 to about 1,000 h or alternatively from about 500 h to about 1,000 h.

The membranes can be mono- or multilayer, and be made from or contain the polyethylene composition in at least one layer.

The membranes can be prepared with a variety of apparatuses and processes, including flat extrusion, blown extrusion and lamination.

In some embodiments, multilayer structures are produced by coextrusion, wherein the polymer materials constituting the single layers are (a) fed to different extruders and coextruded one on top of the other, or (b) extruded separately and then laminated together with heat.

There is believed to be no limitation as to polymerization processes and catalysts for the presently-disclosed applications. In the present application, the polyethylene composition can be prepared by a gas phase polymerization process in the presence of a Ziegler-Natta catalyst.

For the present application, a Ziegler-Natta catalyst is made from or contains a product of a reaction of an organometallic compound of group 1, 2 or 13 of the Periodic Table of elements with a transition metal compound of groups 4 to 10 of the Periodic Table of Elements (new notation). In some embodiments, the transition metal compound can be selected among compounds of Ti, V, Zr, Cr and Hf and, in some embodiments, the transition metal compound can be supported on MgCl$_2$.

In some embodiments, the catalysts can be made from or contain the product of the reaction of the organometallic compound of group 1, 2 or 13 of the Periodic Table of elements, with a solid catalyst component made from or containing a Ti compound supported on MgCl$_2$.

In some embodiments, organometallic compounds are the organo-Al compounds.

In some embodiments, the polyethylene composition is obtainable by using a Ziegler-Natta polymerization catalyst, alternatively a Ziegler-Natta catalyst supported on MgCl$_2$, alternatively a Ziegler-Natta catalyst made from or containing the product of a reaction of:
a) a solid catalyst component made from or containing a Ti compound supported on MgCl$_2$;
b) an organo-Al compound; and optionally
c) an external electron donor compound ED$_{ext}$.

Examples of titanium compounds are the tetrahalides or the compounds of formula TiX$_n$(OR$^1$)$_{4-n}$, where 0≤n≤3, X is halogen, and R$^1$ is C$_1$-C$_{10}$ hydrocarbon group. In some embodiments, the halogen is chlorine. In some embodiments, the titanium compound is titanium tetrachloride.

In the solid catalyst component the MgCl$_2$ is the basic support, even if minor amount of additional carriers can be used. The MgCl$_2$ can be used as such or obtained from Mg compounds used as precursors that can be transformed into MgCl$_2$ by the reaction with halogenating compounds. In some embodiments, the MgCl$_2$ is used in active form. U.S. Pat. No. 4,298,718 and U.S. Pat. No. 4,495,338 disclose that the magnesium dihalides in active form used as support or co-support in components of catalysts for the polymerization of olefins are characterized by X-ray spectra in which the most intense diffraction line that appears in the ASTM-card reference of the spectrum of the non-active halide is diminished in intensity and broadened. In some embodiment, the X-ray spectra of the selected magnesium dihalides in active form shows the most intense line diminished in intensity and replaced by a halo having a maximum intensity displaced towards lower angles relative to that of the most intense line.

In some embodiments, the catalysts have the solid catalyst component a) obtained by contacting the titanium compound with the MgCl$_2$, or a precursor Mg compound, optionally in the presence of an inert medium, at a temperature from 130 to 150° C., alternatively from 135 to 150° C.

The contact with the titanium compound can be carried out one or more times. It can also be carried out in the presence of an electron donor compound. Examples of electron donor compounds are the same as given herein after for the external electron donor compound ED$_{ext}$.

In some embodiments, the contact with the titanium compound is carried out at the temperatures for a total time length of about 0.5-about 2 hours.

As previously mentioned, a precursor of MgCl$_2$ can be used as starting essential Mg compound. In some embodiments, starting essential Mg compounds include a Mg compound of formula MgR'$_2$ where the R' groups can be independently C1-C20 hydrocarbon groups optionally substituted, OR groups, OCOR groups, chlorine, in which R is a C1-C20 hydrocarbon groups optionally substituted, with the proviso that the R' groups are not simultaneously chlorine. Also precursors can be the Lewis adducts between MgCl$_2$ and Lewis bases. A class of precursors can be constituted by the MgCl$_2$ (R"OH)$_m$ adducts in which R" groups are C1-C20 hydrocarbon groups, alternatively C1-C10 alkyl groups, and m is from 0.1 to 6, alternatively from 0.5 to 3 and alternatively from 0.5 to 2. Adducts of this type can be obtained by mixing alcohol and MgCl$_2$ in the presence of an inert hydrocarbon immiscible with the adduct, operating under stirring conditions at the melting temperature of the adduct (100-130° C.). Then, the emulsion is quenched, thereby causing the solidification of the adduct in form of spherical particles. In some embodiments, the preparation of these spherical adducts occur as disclosed in U.S. Pat. Nos. 4,469,648, 4,399,054, or Patent Cooperation Treaty Publication No. WO98/44009. In some embodiments, the method for the spherulization is a spray cooling method as disclosed in U.S. Pat. Nos. 5,100,849 and 4,829,034.

In some embodiments, the MgCl$_2$.(EtOH)$_m$ adducts can be used, in which m is from 0.15 to 1.7 obtained subjecting the adducts with a higher alcohol content to a thermal dealcoholation process carried out in nitrogen flow at temperatures comprised between 50 and 150° C. until the alcohol content is reduced to the above value. In some embodiments, a description of a useful process of this type is disclosed in European Patent Application No. EP 395083.

The dealcoholation can also be carried out chemically by contacting the adduct with compounds capable to react with the alcohol groups.

In some embodiments, these dealcoholated adducts are also characterized by a porosity (measured by mercury method) due to pores with radius up to about 0.1 μm ranging from about 0.15 to about 2.5 cm$^3$/g, alternatively, from about 0.25 to about 1.5 cm$^3$/g.

In some embodiments and at the end of the process, the solid is recovered by separation of the suspension via settling and removing of the liquid, filtration, or centrifugation and can be subject to washings with solvents. Although the washings can be carried out with inert hydrocarbon liquids, it is also possible to use more polar solvents (having for example a higher dielectric constant) such as halogenated hydrocarbons.

In some embodiments, the solid catalyst component is converted into catalysts for the polymerization of olefins by reacting it with an organometallic compound of group 1, 2 or 13 of the Periodic Table of elements. In some embodiments, the organometallic compound is an Al-alkyl compound.

The alkyl-Al compound can be chosen among the trialkyl aluminum compounds such as triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as AlEt$_2$Cl and Al$_2$Et$_3$Cl$_3$ optionally in mixture with the trialkyl aluminum compounds.

In some embodiments, an external electron donor compound ED$_{ext}$ optionally used to prepare the Ziegler-Natta catalysts is selected from the group consisting of ethers, esters, amines, ketones, nitriles, silanes and their mixtures.

Before carrying out the ethylene polymerization to prepare the composition disclosed herein, the catalyst can be prepolymerized by producing reduced amounts of polyolefin, including polypropylene or polyethylene. The amount of prepolymer produced can be up to 500 g per g of component a).

The polyethylene composition can be prepared in a process including the following steps, in any mutual order:
a) polymerizing ethylene, optionally together with one or more comonomers, in a gas-phase reactor in the presence of hydrogen;
b) copolymerizing ethylene with one or more comonomers in another gas-phase reactor in the presence of an amount of hydrogen less than step a);
where, in at least one of the gas-phase reactors, the growing polymer particles flow upward through a first polymerization zone (riser) under fast fluidization or transport conditions, leave the riser and enter a second polymerization zone (downcomer) through which the particles flow downward under the action of gravity, leave the downcomer and are reintroduced into the riser, thus establishing a circulation of polymer between the two polymerization zones.

In the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between 0.5 and 15 m/s, alternatively between 0.8 and 5 m/s. The terms "transport velocity" and "fast fluidization conditions" are used herein as defined in "D. Geldart, Gas Fluidisation Technology, page 155 et seq., J. Wiley & Sons Ltd., 1986" (incorporated herein by reference).

In the second polymerization zone (downcomer), the polymer particles flow under the action of gravity in a densified form, so that high values of density of the solid are reached (mass of polymer per volume of reactor), which approach the bulk density of the polymer.

In other words, the polymer flows vertically down through the downcomer in a plug flow (packed flow mode), so that minimal quantities of gas are entrained between the polymer particles.

Such process allows to obtain from step a) an ethylene polymer with a molecular weight lower than the ethylene copolymer obtained from step b).

In some embodiments, a copolymerization of ethylene to produce a relatively low molecular weight ethylene copolymer (step a) is performed upstream the copolymerization of ethylene to produce a higher molecular weight ethylene copolymer (step b). To this aim, in step a) a gaseous mixture made from or containing ethylene, hydrogen, comonomer and an inert gas is fed to a first gas-phase reactor. In some embodiments, the first gas-phase reactor is a gas-phase fluidized bed reactor. The polymerization is carried out in the presence of the previously described Ziegler-Natta catalyst.

Hydrogen is fed in an amount depending on the specific catalyst used and to obtain in step a) an ethylene polymer with a melt flow index MIE from about 1 to about 25 g/10 min. In order to obtain the MIE range, in step a) the hydrogen/ethylene molar ratio is from about 0.5 to about 3, the amount of ethylene monomer being from about 2 to about 15% by volume, alternatively from about 4 to about 10% by volume, based on the total volume of gas present in the polymerization reactor. The remaining portion of the feeding mixture is represented by inert gases and one or more comonomers, if any. Inert gases which facilitate dissipation of the heat generated by the polymerization reaction are selected from nitrogen or saturated hydrocarbons. In some embodiments, the inert gas is propane.

The operating temperature in the reactor of step a) is selected between 50 and 120° C., alternatively between 65 and 100° C., while the operating pressure is between 0.5 and 10 MPa, alternatively between 2.0 and 3.5 MPa.

In some embodiments, the ethylene polymer obtained in step a) represents from about 40 to about 60% by weight of the total ethylene polymer produced in the overall process, i.e. in the first and second serially connected reactors.

The ethylene polymer coming from step a) and the entrained gas are then passed through a solid/gas separation step. The gaseous mixture can be recycled back to the first polymerization reactor, while the separated ethylene polymer is fed to the reactor of step b). In some embodiments, the polymer is fed into the second reactor on the connecting part between the downcomer and the riser, wherein the solid concentration is low, so that the flow conditions are not negatively affected.

The operating temperature in step b) is in the range of about 65 to about 95° C., and the pressure is in the range of about 1.5 to about 4.0 MPa. The second gas-phase reactor is aimed to produce a higher molecular weight ethylene copolymer by copolymerizing ethylene with one or more comonomers. Furthermore, to broaden the molecular weight distribution of the final ethylene polymer, the reactor of step b) can be operated by establishing different conditions of monomers and hydrogen concentration within the riser and the downcomer.

In step b) the gas mixture entraining the polymer particles and coming from the riser can be partially or totally prevented from entering the downcomer to obtain two different gas composition zones. In some embodiments, this is achieved by feeding a gas and/or a liquid mixture into the downcomer through a line placed at a point of the downcomer. In some embodiments, the point is in the upper part thereof. The gas and/or liquid mixture should have a composition, different from that of the gas mixture present in the riser. The flow of the gas and/or liquid mixture can be regulated so that an upward flow of gas counter-current to the flow of the polymer particles is generated. In some embodiments, the gas counter-current is generated at the top thereof, acting as a barrier to the gas mixture entrained among the polymer particles coming from the riser. In some embodiments, a mixture with low content of hydrogen is fed to produce the higher molecular weight polymer fraction in the downcomer. One or more comonomers can be fed to the downcomer of step b), optionally together with ethylene, propane or other inert gases.

The hydrogen/ethylene molar ratio in the downcomer of step b) is between aobut 0.005 and about 0.2, the ethylene concentration is from about 0.5 to about 15%, alternatively about 0.5-about 10%, by volume, the comonomer concentration is from about 0.2 to about 1.2% by volume, based on the total volume of gas present in the downcomer. The rest is propane or similar inert gases. In some embodiments, a relatively high amount of comonomer is bonded to the high molecular weight polyethylene fraction.

The polymer particles coming from the downcomer are reintroduced in the riser of step b).

In some embodiments, the polymer particles keep reacting, no more comonomer is fed to the riser, and the concentration of the comonomer drops to a range of about 0.1 to about 0.8% by volume, based on the total volume of gas present in the riser. In some embodiments, the comonomer content is controlled in order to obtain the density of the final polyethylene. In the riser of step b) the hydrogen/ethylene molar ratio is in the range of about 0.2 to about 1, the ethylene concentration is between about 5 and about 15% by volume based on the total volume of gas present in the riser. The rest is propane or other inert gases.

In some embodiments, the described polymerization process is as disclosed in Patent Cooperation Treaty Publication No. WO2005/019280.

EXAMPLES

The practice and advantages of the various embodiments, compositions and methods as provided herein are disclosed below in the following, non-limiting examples. These non-limiting examples are illustrative only, and are not intended to limit the scope of the appended claims in any manner whatsoever.

The following analytical methods are used to characterize the polymer compositions.

Density

Determined according to ISO 1183 at 23° C.

Molecular Weight Distribution Determination

The determination of the molar mass distributions and the mean number average mol. weight Mn was carried out by high-temperature gel permeation chromatography using a method described in ISO 16014-1, -2, -4, issues of 2003. The weight-average mol. weight $M_w$ and the z-average $M_z$, as well as the $M_w/M_n$ derived where determined by the MALLS coupled to the GPC, as described below. The specifics according to the mentioned ISO standards are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following precolumn SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used. The solvent was vacuum distilled under nitrogen and was stabilized with 0.025% by weight of 2,6-di-tert-butyl-4-methylphenol. The flowrate used was 1 ml/min, the injection was 500 µl and the polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany) in the range from 580 g/mol up to 11600000 g/mol and additionally with hexadecane. The calibration curve was then adapted to polyethylene (PE) by means of the Universal Calibration method (Benoit H., Rempp P. and Grubisic Z., & in J. Polymer Sci., Phys. Ed., 5, 753(1967)). The Mark-Houwing parameters for PS: $k_{PS}$=0.000121 dl/g, $\alpha_{ps}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTG-PC_V6.4.24 (hs GmbH, HauptstraBe 36, D-55437 Ober-Hilbersheim, Germany) respectively.

Melt Flow Index

Determined according to ISO 1133 at 190° C. with the specified load.

Long Chain Branching Index (LCBI)

The LCBI corresponds to the branching factor g', measured for a molecular weight of $10^6$ g/mol. The branching factor g', which allows determining long-chain branches at high Mw, was measured by Gel Permeation Chromatography (GPC) coupled with Multi-Angle Laser-Light Scattering (MALLS). The radius of gyration for each fraction eluted from the GPC (as described above but with a flowrate of 0.6 ml/min and a column packed with 30 µm particles) is measured by analyzing the light scattering at the different angles with the MALLS (detector Wyatt Dawn EOS, Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software. The LCBI is determined as described in the following.

The parameter g' is the ratio of the measured mean square radius of gyration to that of a linear polymer having the same molecular weight. Linear molecules show g' of 1, while values less than 1 indicate the presence of long chain branching. Values of g' as a function of mol. weight, M, were calculated from the equation:

$$g'(M) = <Rg^2>_{sample,M} / <Rg^2>_{linear\ ref,M}$$

where $<Rg^2>$, M is the root-mean-square radius of gyration for the fraction of mol. weight M.

The radius of gyration for each fraction eluted from the GPC (as described above but with a flow-rate of 0.6 ml/min and a column packed with 30 µm particles) is measured by analyzing the light scattering at the different angles. Therefore, from this MALLS setup it is possible to determine mol. weight M and $<Rg^2>_{sample,M}$ and to define a g' at a measured M=$10^6$ g/mol. The $<Rg^2>_{linear\ ref,M}$ is calculated by the established relation between radius-of-gyration and molecular weight for a linear polymer in solution and confirmed by measuring a linear PE reference with the same apparatus and methodology described.

The same protocol is described in the following documents.

Zimm & Stockmayer. "*The dimensions of chain molecules containing branches and rings.*" 17 J Chem Phys (1949) and Rubinstein & Colby R H., "*Polymer Physics,*" Oxford University Press (2003)

Comonomer Content

The comonomer content is determined by IR in accordance with ASTM D 6248 98, using an FT-IR spectrometer Tensor 27 from Bruker, calibrated with a chemometric model for determining ethyl- or butyl-side-chains in PE for butene or hexene as comonomer, respectively. The result is compared to the estimated comonomer content derived from the mass-balance of the polymerization process.

Environmental Stress Cracking Resistance According to Full Notch Creep Test (FNCT)

The environmental stress cracking resistance of polymer samples is determined in accordance to international standard ISO 16770 (FNCT) in aqueous surfactant solution. From the polymer sample, a compression molded 10 mm thick sheet is prepared. The bars with squared cross section (10×10×100 mm) are notched using a razor blade on four sides perpendicularly to the stress direction. The sharp notch is to a depth of 1.6 mm. The load applied is calculated from tensile force divided by the initial ligament area. Ligament area is the remaining area=total cross-section area of specimen minus the notch area. For FNCT specimen: 10×10 mm$^2$-4 times of trapezoid notch area=46.24 mm$^2$ (the remaining cross-section for the failure process/crack propagation). The test specimen is loaded with standard condition suggested by the ISO 16770 with constant load of 4 MPa at 80° C. in a 2% (by weight) water solution of non-ionic surfactant ARKOPAL N100 and 5% of anionic surfactant GENAPOL Paste (Clariant CAS 68891-38-3). Time until rupture of test specimen is detected.

Elongational Hardening

Elongational hardening is the increase of melt viscosity measured under uniaxial elongation with constant elongational rate as compared to the steady-state viscosity value, $\eta_{E,max}/\eta_s$.

The determination of elongational hardening (also called strain hardening) is carried out during uniaxial elongation, at a constant elongational rate and at T=150° C.

The measurements are performed on a rotational rheometer instrument Physica MCR 301 from AntonPaar, equipped with the Sentmanant Elongational Rheology tool (SER). The measurements are performed at 150° C., after an annealing time of 5 min at the measurement temperature. The measurements are repeated for different specimens of each sample at elongational rates varying between 0.01 s$^{-1}$ and 10 s$^{-1}$, sometimes including at 0.01, 0.05, 0.1, 0.5, 1, 5, 10 s$^{-1}$. For each measurement, the uniaxial elongational melt viscosity is recorded as a function of time.

The test specimens are prepared for the measurement as follows: 2.2 g of the material is weighed and used to fill a molding plate of 70×40×1 mm. The plate is placed in a press and heated up to 200° C., for 1 min, under a pressure of 25 bar. After the temperature of 200° C. is reached, the sample is pressed at 100 bar for 4 min. Next, the material is cooled to room temperature and the plates are removed from the form. From the 1 mm thick compressed polymer plate, rectangular films of 12×11 mm are cut off and measured.

Elongational hardening in uniaxial elongation is the ratio of the maximum melt elongational viscosity measured at the specific elongation rate, $\eta_{E,max}$, over the linear response at the same time, $\eta_s$. If no plateau is observed after a certain elongation, the $\eta_{E,max}$ can be defined as the maximum polymer melt viscosity value, under uniaxial elongation with the specific elongational rate at the temperature of 150° C., measured at a time t=3×1/(elongational-rate) after the start of deformation or at elongations L(t)/L(0)≥3 (e.g. for elongational rates of 1 1/s after t=3 sec and for elongational rates of 5 1/s after t=0.6 sec).

The linear viscoelastic response, $\eta s$, is calculated from fitting linear rheological data of G' and G" at the same temperature with a multi-mode Maxwell model, calculating the transient shear viscosity and multiplying by 3 (Trouton ratio). Because the measurement is not an ideal uniaxial elongation, the Trouton ratio may be between 3 and 4 with the target being to fit the steady-state elongational viscosity curve at the measured elongational rates.

The method is described in Mackosko C. W. "Rheology Principles, Measurements and Applications," Wiley-VCH, New York (1994). A direct correlation between strain hardening at uniaxial elongation and long-chain branching in PE is believed to exist.

Example 1

Process Setup

The process was carried out under continuous conditions in a plant including two serially connected gas-phase reactors.

The solid catalyst component was prepared as follows.

A magnesium chloride and alcohol adduct containing about 3 mols of alcohol was prepared following the method described in Example 2 of U.S. Pat. No. 4,399,054, at 2000 RPM instead of 10000 RPM. The adduct was subjected to a thermal treatment, under nitrogen stream, over a temperature range of 50-150° C. until a weight content of 25% of alcohol was reached. Into a 2 L four-necked round flask, purged with nitrogen, 1 L of TiCl$_4$ was introduced at about 0° C. Then, at about the same temperature, 70 g of a spherical MgCl$_2$/EtOH adduct containing 25% wt of ethanol and was added under stirring. The temperature was raised to about 140° C. in about 2 h and maintained for about 60 min. Then, the stirring was discontinued, the solid product was allowed to settle, and the supernatant liquid was siphoned off.

The solid residue was then washed once with heptane at 80° C. and five times with hexane at 25° C. and dried under vacuum at 30° C.

The solid catalyst component was prepolymerized with propylene in amount of 1g polypropylene/g of catalyst component, in accordance with the method described in Example 7 of Patent Cooperation Treaty Publication No. WO01/85803.

Polymerization 11.5 g/h of the solid catalyst component were fed, using 5.0 kg/h of liquid propane, to a precontacting apparatus, in which also triisobutylaluminum (TIBA) was dosed. The weight ratio between aluminum alkyl and solid catalyst component was 2.0 g/g. The precontacting step was carried out under stirring at 40° C. with a total residence time of 120 minutes.

As illustrated in FIG. 1, the catalyst entered the first gas-phase polymerization reactor 1 of the drawing via line 10. In the first reactor, ethylene was polymerized using H$_2$ as molecular weight regulator and in the presence of propane as inert diluent. 46 kg/h of ethylene and 42 g/h of hydrogen were fed to the first reactor via line 9. 1.5 kg/h comonomer (1-hexene) was fed to the first reactor.

The polymerization was carried out at a temperature of 80° C. and at a pressure of 2.9 MPa. The polymer obtained in the first reactor was discharged via line 11, separated from the gas into the gas/solid separator 12, and reintroduced into the second gas-phase reactor via line 14.

The polymer produced in the first reactor had a melt index MIE of 16.2 g/10 min and a density of 0.947 kg/dm$^3$.

The second reactor was operated under polymerization conditions of about 77° C., and a pressure of 2.5 MPa. 15 kg/h of ethylene and 3.5 kg/h of 1-hexene were introduced in the downcomer 33 of the second reactor via line 46. 5.0 kg/h of propane, 25 kg/h of ethylene and 9.5 g/h of hydrogen were fed through line 45 into the recycling system.

To broaden the molecular weight distribution of the final ethylene polymer, the second reactor was operated by establishing different conditions of monomers and hydrogen concentration within the riser 32 and the downcomer 33. An amount (330 kg/h) of a liquid stream (liquid barrier) was fed via line 52 into the upper part of the downcomer 33. The liquid stream had a composition different from that of the gas mixture present in the riser. The different concentrations of monomers and hydrogen within the riser, the downcomer of the second reactor and the composition of the liquid barrier are indicated in Table 1. The liquid stream of line 52 came from the condensation step in the condenser 49, at working conditions of 50° C. and 2.45 MPa, wherein a part of the recycle stream is cooled and partially condensed. A separating vessel and a pump were placed, in the order, downstream the condenser 49. The final polymer was discharged via line 54.

The polymerization process in the second reactor produced higher molecular weight polyethylene fractions. In Table 1 the properties of the final product are specified.

The first reactor produced around 52% by weight (split wt %) of the total amount of the final polyethylene resin produced by both first and second reactors. At the same time, the obtained polymer had a broad molecular weight distribution as evidenced by a ratio MIF/MIP equal to 43.4.

The comonomer (hexene-1) amount was of about 5% by weight.

Comparative Example 1

The comparative example was a polyethylene composition, prepared with a loop polymerization process, available commercially under the name Marlex K306 from Chevron-Phillips.

TABLE 1

|  | Ex. 1 | Comp. 1 |
| --- | --- | --- |
| Operating conditions first reactor - preparation of copolymer (A) |  |  |
| H$_2$/C$_2$H$_4$ Molar ratio | 1.2 |  |
| C$_2$H$_4$ % | 5.5 |  |
| C$_6$H$_{12}$ % | 0.17 |  |
| Split (wt %) | 52 |  |
| Operating conditions second reactor - preparation of copolymer (B) |  |  |
| H$_2$/C$_2$H$_4$ Molar ratio riser | 0.5 |  |
| C$_2$H$_4$ % riser | 9.3 |  |
| C$_6$H$_{12}$ % riser | 0.55 |  |
| H$_2$/C$_2$H$_4$ Molar ratio downcomer | 0.03 |  |
| C$_2$H$_4$ % downcomer | 1.0 |  |
| C$_6$H$_{12}$ % downcomer | 0.90 |  |
| H$_2$/C$_2$H$_4$ Molar ratio barrier | 0.003 |  |
| C$_2$H$_4$ % barrier | 3.9 |  |
| C$_6$H$_{12}$ % barrier | 0.95 |  |
| Polymer properties |  |  |
| MIE (A) [g/10 min] | 16.2 |  |
| Density (A) [g/cm$^3$] | 0.947 |  |
| MIP final resin [g/10 min] | 0.30 | 0.46 |
| MIF final resin [g/10 min] | 12.9 | 11.9 |
| Density final resin [g/cm$^3$] | 0.938 | 0.938 |
| MIF/MIP final resin | 43.4 | 25.8 |
| FNCT (80° C., 4 MPa) [h] | 594.8 | 142.1 |
| M$_{w\_MALLS}$/M$_{n\_GPC}$ | 42 | 7 |
| M$_{w\_MALLS}$ [g/mol] from GPC-MALLS | 531,612 | 142,395 |
| M$_{z\_MALLS}$ [g/mol] from GPC-MALLS | 2,636,636 | 458,723 |
| LCB g' (at 1,000,000 g/mol) from GPC MALLS | 0.42 | 0.97 |
| Elongational Hardening @ 0.5 s$^{-1}$, T = 150° C. | 1.2 | 1.2 |
| Elongational Hardening @ 0.1 s$^{-1}$, T = 150° C. | 1.2 | 1.2 |

Notes:
C$_2$H$_4$ = ethylene;
C$_6$H$_{12}$ = hexene.

What is claimed is:

1. A polyethylene composition comprising:
   1) a density from about 0.930 to about 0.945 g/cm$^3$, determined according to ISO 1183 at 23° C.;
   2) a ratio of MIF/MIP from about 30 to about 55, where MIF is the melt flow index at 190° C. with a load of 21.60 kg, and MIP is the melt flow index at 190° C. with a load of 5 kg, both determined according to ISO 1133;
   3) a MIF from about 3 to about 25 g/10 min;
   4) a Mz equal to or greater than 1,500,000 g/mol, measured by GPC-MALLS (Gel Permeation Chromatography coupled with Multi-angle laser-light scattering); and
   5) a long-chain branching index, LCBI, equal to or lower than about 0.55, at a molecular weight of 1,000,000 g/mol,
   wherein LCBI is the ratio of the measured mean-square radius of gyration R$_g$, measured by GPC-MALLS, to the mean-square radius of gyration for a linear PE having about the same molecular weight.

2. The polyethylene composition of claim 1, wherein the polyethyelene has Mw equal to or higher than about 300,000 g/mol.

3. The polyethylene composition of claim 1, wherein the polyethylene comprises ethylene copolymer.

4. The polyethylene composition of claim 1, wherein the polyethylene is prepared by a process using a Ziegler-Natta polymerization catalyst.

5. The polyethylene composition of claim 4, wherein the Ziegler-Natta polymerization catalyst comprises a product of a reaction between:
   a) a solid catalyst component comprising a Ti compound supported on MgCl$_2$, obtained by contacting the titanium compound with the MgCl$_2$, or a precursor Mg compound, optionally in the presence of an inert medium, at a temperature from 130 to 150° C.;
   b) an organo-Al compound; and optionally
   c) an external electron donor compound.

6. The polyethylene composition of claim 1, wherein the polyethylene has a property selected from the group consisting of:

a) a ratio of Mw/Mn from about 36 to about 48;
b) a MIP in the range from about 0.05 to about 1.5 g/10 min.;
c) an elongational hardening at 0.5 s$^{-1}$, T=150° C. of about 0.9 or higher;
d) an elongational hardening at 0.1 s$^{-1}$, T=150° C. of about 0.9 or higher; and
e) a comonomer content equal to or less than about 8% by weight, based upon the total weight of the polyethylene.

7. The polyethylene composition of claim 1, wherein the polyethylene comprises:
A) about 40 to about 60% by weight of an ethylene homopolymer or copolymer, based upon the total weight of the polyethylene, having
  i) a density equal to or greater than about 0.945 g/cm$^3$ and
  ii) a melt flow index MIE at 190° C. with a load of 2.16 kg, according to ISO 1133, of about 1 about 25 g/10 min.; and
B) about 40 to about 60% by weight of an ethylene copolymer, based upon the total weight of the polyethylene, having
i) a MIE value lower than the MIE value of component A.

8. An article of manufacture comprising:
A) a polyethylene composition comprising:
  1) a polyethylene having the properties of
    a) a density from about 0.930 to about 0.945 g/cm$^3$, determined according to ISO 1183 at 23° C.;
    b) a ratio of MIF/MIP from about 30 to about 55, where MIF is the melt flow index at 190° C. with a load of 21.60 kg, and MIP is the melt flow index at 190° C. with a load of 5 kg, both determined according to ISO 1133;
    c) a MIF from about 3 to about 25 g/10 min;
    d) a Mz equal to or greater than 1,500,000 g/mol, measured by GPC-MALLS (Gel Permeation Chromatography coupled with Multi-angle laser-light scattering); and
    e) a long-chain branching index, LCBI, equal to or lower than about 0.55, at a molecular weight of 1,000,000 g/mol, wherein LCBI is the ratio of the measured mean-square radius of gyration R$_g$, measured by GPC-MALLS, to the mean-square radius of gyration for a linear PE having about the same molecular weight.

9. The article of manufacture according to claim 8, being a membrane having a layer comprising:
a) the polyethylene composition.

10. A process for preparing a polyethylene composition comprising the step of contacting ethylene with a Ziegler-Natta catalyst supported on MgCl$_2$ under polymerization conditions, wherein the polyethylene composition has the following properties:
1) a density from about 0.930 to about 0.945 g/cm$^3$, determined according to ISO 1183 at 23° C.;
2) a ratio of MIF/MIP from about 30 to about 55, where MIF is the melt flow index at 190° C. with a load of 21.60 kg, and MIP is the melt flow index at 190° C. with a load of 5 kg, both determined according to ISO 1133;
3) an MIF from about 3 to about 25 g/10 min;
4) an Mz equal to or greater than 1,500,000 g/mol, measured by GPC-MALLS (Gel Permeation Chromatography coupled with Multi-angle laser-light scattering); and
5) a long-chain branching index, LCBI, equal to or lower than about 0.55, at a molecular weight of 1,000,000 g/mol, wherein LCBI is the ratio of the measured mean-square radius of gyration R$_g$, measured by GPC-MALLS, to the mean-square radius of gyration for a linear PE having about the same molecular weight.

11. The process of claim 10, comprising the following steps, in any mutual order:
a) polymerizing ethylene, optionally together with one or more comonomers, in a gas-phase reactor in the presence of hydrogen; and
b) copolymerizing ethylene with one or more comonomers in another gas-phase reactor in the presence of an amount of hydrogen less than step a);
wherein, in at least one of the gas-phase reactors, the growing polymer particles flow upward through a first polymerization zone under fast fluidization or transport conditions, leave the riser and enter a second polymerization zone through which the particles flow downward under the action of gravity, leave the second polymerization zone and are reintroduced into the first polymerization zone, thus establishing a circulation of polymer between the two polymerization zones.

* * * * *

UNITED STATES PATENT AND TRADEMARK OFFICE
CERTIFICATE OF CORRECTION

PATENT NO. : 9,879,099 B2  
APPLICATION NO. : 15/527158  
DATED : January 30, 2018  
INVENTOR(S) : Mannebach et al.

Page 1 of 1

It is certified that error appears in the above-identified patent and that said Letters Patent is hereby corrected as shown below:

In the Specification

In Column 3, Line 2, delete "0.3,", and insert -- 0.30, --.

In the Claims

In Column 12, Line 51, Claim 3, after "comprises" insert -- an --.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*